Nov. 22, 1932. D. D. THOMAS 1,888,481
GREASE CUP
Filed Dec. 28, 1928
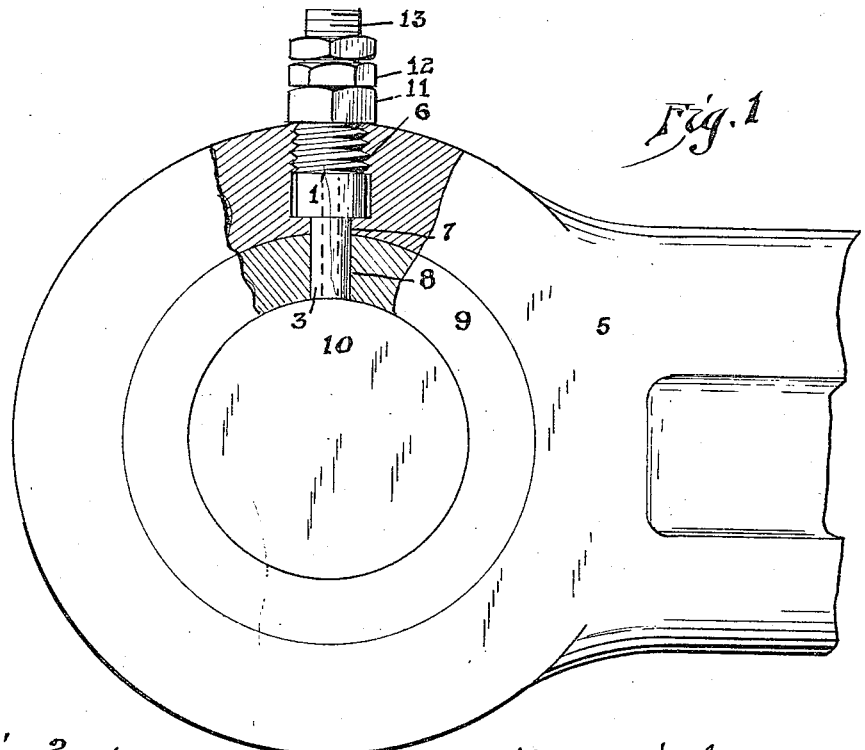
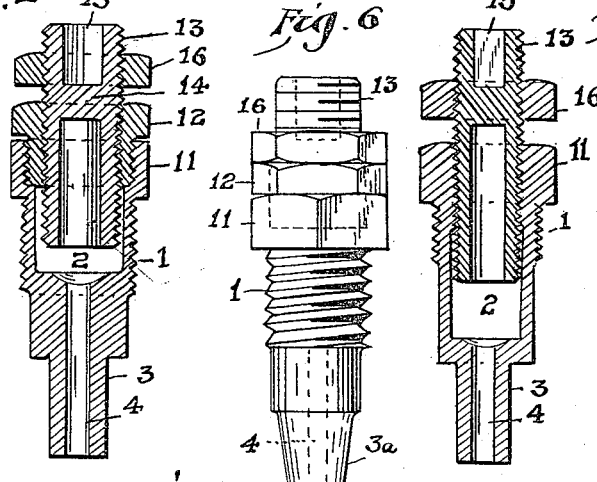
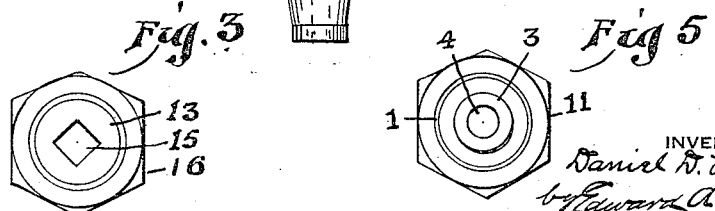
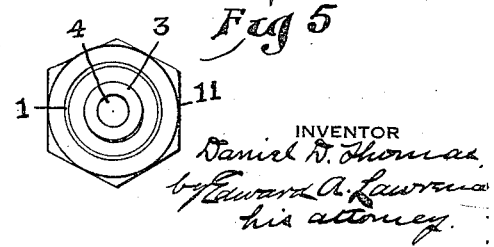
INVENTOR
Daniel D. Thomas
by Edward A. Lawrence
his attorney.

Patented Nov. 22, 1932

1,888,481

UNITED STATES PATENT OFFICE

DANIEL D. THOMAS, OF TOWNSHIP OF MOON, ALLEGHENY COUNTY, PENNSYLVANIA

GREASE CUP

Application filed December 28, 1928. Serial No. 328,934.

More particularly my improved grease cup is intended for lubricating the connection between the crank pin of a locomotive driving wheel, or the like, and the driving rod.

In the accompanying drawing, wherein I have illustrated the best embodiment of the principles of my invention now known to me, Fig. 1 is a broken side elevation showing a locomotive driving rod and crank pin and my improved grease cup applied thereto.

Fig. 2 is a longitudinal section of the grease cup.

Fig. 3 is an outer end view of the same.

Fig. 4 is a longitudinal section of a modification.

Fig. 5 is an inner end view of the latter.

Fig. 6 is an elevation showing a further modification.

The grease cup, as illustrated in Figs. 1, 2, and 3, has the following structure.

1 represents the cylindrical receptacle member having its one end, the outer end when in use, of larger outer diameter and larger interior bore, its bore forming the lubricant pressure chamber 2. This end of the member 1 is provided with exterior screw threads.

The other end of the member 1 is of lesser diameter, forming a reduced neck 3 whose bore 4 forms a lubricant delivery passage.

When mounted in place on the driving rod 5, the portion of larger diameter of the member 1 is screwed into an internally threaded socket 6 in the end portion or strap of the driving rod, while the neck 3 extends through registering passages 7 in the driving rod 8 in the bushing 9 so as to deliver lubricant to the surface of the crank pin 10.

The outer end of the member 1 is provided with a circumferential enlargement or head 11 which is squared or provided with angular surfaces for the application of a wrench or other tool for screwing the member 1 into the socket 6. When the member 1 is installed it is screwed in until the head 11 impinges against the driving rod.

The outer end of the bore of the lubricant pressure chamber is counter-sunk and internally threaded to permit the wear-bushing 12 to be screwed into the end of the member 1.

The bushing 12 is also internally threaded to receive the exteriorly threaded tubular plunger 13. The bushing 12 is provided with an enlarged head for the application of a tool to rotate the bushing. When in place the head of the bushing impinges on the end of the member 1.

The bore of the plunger 13 is blocked intermediate of its end, as at 14, to prevent the escape of lubricant under pressure, and the outer portion 15 of the bore of the plunger is of angular cross-sectional shape to permit the application of the tool to rotate the plunger either in applying a pressure to the lubricant or to remove the plunger from the receptacle.

16 represents a lock-nut on the plunger 13 which is screwed up against the end of the bushing 12 to prevent accidental movement of the plunger relative to the grease cup.

In Figs. 4 and 5 the structure of the grease cup is the same as that above described except that the wear-bushing 12 is omitted and the plunger has direct threaded engagement with the interior threaded bore of the chamber 2, the counter-sinking being also omitted.

When the grease cup is to be refilled, all that is necessary is to remove the plunger and refill the chamber 2. There are no parts embedded or buried under the grease which must be first dug out and then removed, as is the case with the grease cup now in general use for lubricating locomotive journals and bearings.

In the case of my improved grease cup, after the removal of the plunger, the chamber 2 is refilled with lubricant and the plunger screwed into the chamber or wear-bushing to exert the necessary pressure on the lubricant. The lock-nut is then screwed down tight against the end of the member 1 or against the wear-bushing as the case may be.

By applying a tool to the enlargement on the outer end of the member 1 the entire grease cup may be removed from its mounting as a unit.

In Fig. 6 I show the neck of the receptacle member 1 made tapered as at 3a, thus providing for the insertion of the neck of the grease cup into a tapered passage.

My improved grease cup is a very simple and inexpensive construction. It is remarkably rugged and durable. The parts are not liable to wear, and any wear which might take place between the member 1 and the plunger may be assumed by the easily removable wear-bushing.

What I desire to claim is:—

1. In combination with a seat in a driving rod consisting of an outer screw socket sunk into the rod of greater diameter and an interior passage of lesser diameter leading to the crank pin bearing, a grease cup comprising in an integral structure a receptacle member having its outer end portion diametrically enlarged to form the lubricant pressure chamber and exteriorly threaded so as to be screwed into said socket and having its inner end diametrically reduced to form a tubular neck extending into said passage and the bore of said neck communicating with the pressure chamber, and a pressure plunger exteriorly threaded throughout its length and working by means of screw engagement in said pressure chamber.

2. In combination with a seat in a driving rod consisting of an outer screw socket sunk into the rod of greater diameter and an interior passage of lesser diameter leading to the crank pin bearing, a grease cup comprising in an integral structure a receptacle member having its outer end portion diametrically enlarged to form the lubricant pressure chamber and exteriorly threaded so as to be screwed into said socket and having its inner end diametrically reduced to form a tubular neck extending into said passage and the bore of said neck communicating with the pressure chamber, and an exteriorly and interiorly threaded bushing screwed into the outer end of said pressure chamber and a pressure plunger screwed into said bushing.

3. In a grease cup, the combination of an integral receptacle member having its one end portion diametrically enlarged to form the lubricant pressure chamber and exteriorly threaded so as to be screwed into its mounting and having its other end portion diametrically reduced to form a tubular neck for the discharge of lubricant, and an exteriorly and interiorly threaded bushing screwed into the open end of said pressure chamber, and a threaded pressure plunger exteriorly threaded throughout its length and adapted to be screwed into said bushing.

4. In a grease cup, which is designed for use for lubricating the bearing of a locomotive crank pin and to be screwed into a cylindrical passage of differential diameter formed in the driving rod and bushing and the larger and outer portion of said passage being internally threaded, the combination of a one-piece cup member having a relatively large body portion of proper external diameter and threaded to be screwed into the larger portion of said passage, and having extending therefrom a tubular stem of proper external diameter to fit the smaller portion of said passage and provided with a restricted passage bore, the outer end of said cup being provided with an enlarged head with angular perimetral portions to receive a tool for installing and removing said cup, and a plunger having screw threaded engagement with the outer end of said cup and arranged to be projected therein to force the lubricant into the bearing.

5. In a grease cup, which is designed for use for lubricating the bearing of a locomotive crank pin and to be screwed into a cylindrical passage of differential diameter formed in the driving rod and bushing and the larger and outer portion of said passage being internally threaded, the combination of a one-piece cup member having a relatively large body portion of proper external diameter and threaded to be screwed into the larger portion of said passage, and having extending therefrom a tubular stem of proper external diameter to fit the smaller portion of said passage and provided with a restricted passage bore, the outer end of said cup being provided with an enlarged head with angular perimetral portion to receive a tool for installing and removing said cup, and a plunger having screw threaded engagement with the outer end of said cup and arranged to be projected therein to force the lubricant into the bearing, the plunger being tubular with its bore blocked intermediate of its ends and its outer bore being non-circular for engagement by a socket wrench.

6. In a grease cup, which is designed for use for lubricating the bearing of a locomotive crank pin and to be screwed into a cylindrical passage of differential diameter formed in the driving rod and bushing and the larger and outer portion of said passage being internally threaded, the combination of a one-piece cup member having a relatively large body portion of proper external diameter and threaded to be screwed into the larger portion of said passage, and having extended therefrom a tubular stem of proper external diameter to fit the smaller portion of said passage and provided with a restricted passage bore, the outer end of said cup being provided with an enlarged head with angular perimetral portions to receive a tool for installing and removing said cup, the outer portion of said cup being enlarged interiorly and threaded, a bushing, externally and internally threaded, screwed into said enlarged portion of the cup and having an enlarged head with angular perimetral surfaces for the application of the tool, and a threaded plunger screwed into said bushing and arranged to be projected into said cup to force the lubricant into the bearing, said plunger having its outer end arranged for the application of the tool.

Signed at Coraopolis, Penna. this 22nd day of December 1928.

DANIEL D. THOMAS.